United States Patent
Houser et al.

(10) Patent No.: US 7,467,800 B2
(45) Date of Patent: Dec. 23, 2008

(54) ALL TERRAIN VEHICLE WITH IN-MOTION CASTER ADJUSTMENT

(75) Inventors: John Abbott Houser, Marion, OH (US); Jeffrey David Houser, Green Camp, OH (US)

(73) Assignee: Houser Products, LLC, Marion, OH (US)

( * ) Notice: Subject to any disclaimer, the term of this patent is extended or adjusted under 35 U.S.C. 154(b) by 336 days.

(21) Appl. No.: 11/408,518

(22) Filed: Apr. 21, 2006

(65) Prior Publication Data

US 2007/0246901 A1    Oct. 25, 2007

(51) Int. Cl.
*B62D 17/00* (2006.01)

(52) U.S. Cl. .................. 280/5.521; 280/124.138; 280/86.751

(58) Field of Classification Search .......... 280/5.5, 280/5.52, 5.521, 5.522, 86.75, 86.751, 86.756, 280/86.757, 86.758, 93.511, 93.512, 86.754, 280/124.134, 124.135, 124.138, 124.15
See application file for complete search history.

(56) References Cited

U.S. PATENT DOCUMENTS 5,700,025 A * 12/1997 Lee ................ 280/86.751
2003/0122338 A1 * 7/2003 Carlstedt et al. ...... 280/124.134

* cited by examiner

*Primary Examiner*—Paul N. Dickson
*Assistant Examiner*—Drew J. Brown
(74) *Attorney, Agent, or Firm*—Mueller Smith

(57) ABSTRACT

The front wheel suspension assemblies of an ATV are configured with translation assemblies aligned along a translation axis generally parallel with the vehicle axis. These translation mechanisms are engaged by pivotal follower assemblies attached to a ball joint which are moveable along the translation axis either by the pivoting action of the suspension control arms or by a motor driven system.

18 Claims, 6 Drawing Sheets

ALL TERRAIN VEHICLE WITH IN-MOTION CASTER ADJUSTMENT

CROSS-REFERENCE TO RELATED APPLICATIONS

STATEMENT REGARDING FEDERALLY SPONSORED RESEARCH

Not applicable.

BACKGROUND OF THE INVENTION

In 1967 the American counterpart to a global motorcycle manufacturer requested the development of a vehicle that its dealers could sell during the winter season of slackening motorcycle sales. The result was the introduction of a three-wheeled all terrain vehicle (ATV) which debuted in 1970. This original ATV exhibited a tricycle geometry and employed a seven horsepower motorcycle engine to drive two rear twenty-two inch low pressure tires through a dual-range, four-speed gear box with an automatic clutch. The machines handled snow, mud and various slippery conditions which a motorcycle couldn't.

Further development optimized tire and chassis design. While then primarily a recreational device, farmers saw substantial utility in the ATV. In this regard, a farm tractor costs exponentially more than an ATV and a typical ATV utilized 8% of the fuel consumed by such a tractor. This multipurpose usage grew from about 30% of total usage to about 80% total usage in the current market. The other major ATV interest in the 1980s was racing everywhere from frozen lakes in the East to Western dessert to the dirt ovals of Middle America. Four-wheel machines were introduced in 1984 and were considered more versatile, particularly for utilitarian use. Inevitable accident statistics prompted the Consumer Product Safety Commission (CPSC) to mandate a four-wheel design. By 2001, the ATV industry was selling about 400,000 units per year.

Two basic types of ATVs have evolved to suit the needs of riders. These include: sport models referred to as "sport quads" which are used by high performers, for instance, in racing and to some extent by casual recreationists and utility models used for a wide range of work and recreation activities.

Utility models typically incorporate four-wheel drive and will weigh about 400-500 pounds. Sport quads incorporate two-wheel drive, somewhat expensive suspensions and more refined motors. Typically weighing about 370 pounds, these sport vehicles are quicker and more responsive than the utility models. Just as in essentially all forms of automotive racing, the talent of the driver is quite important. For instance, with two-wheel drive, when beginning a turn, a bit more throttle is employed and a slight "slide" of the rear wheels is developed. Thus the type of terrain on which the vehicles are driven has a high importance with respect to racing technique and generally varies from racing venue-to-venue.

As may be expected, sport quad racing also calls for a tuning of front end suspension which is characterized preferably with optimization for each track. For instance, the two front wheels are suspended from ball joints, in turn supported by upper and lower A-frames or control frames pivotally mounted to the chassis with rod end Heim joints. For a highest level of performance at each racing venue, experienced mechanics will adjust these suspensions for caster and camber. Caster is the angle between a vertical line and the ATV's steering axis when viewed from the side. It is measured in degrees and minutes. Negative caster generally gives more steering going into a turn, but less coming out. Positive caster gives less steering going into a turn (initial steering), but more steering as the vehicle exits. Caster is adjusted to provide more stability on straightaway performance.

Camber, as seen from the front and rear of the ATV is the angle of the tires in relation to the ground. Tires that are perfectly perpendicular to the ground (90°) are said to be at "zero camber". If the tops of the tires lean toward each other, the tires have negative camber, and if they lean out, the tires have positive camber.

While camber can be tuned by bolt and nut adjustment at the upper ball joint, caster cannot. Typically, caster is adjusted by removing the upper A-frame structure and making an adjustment at the rod end Heim joint. Unfortunately, that form of adjustment also affects camber. Accordingly, a substantial amount of talent is required for making a caster adjustment. An improved caster adjusting mechanism was introduced by Houser, et al, in 2005. Sold under the trade designation "Slicast™" and described in application for U.S. patent Ser. No. 11/266,697 filed Nov. 3, 2005, the mechanism employs indexably rotatable ball joint threaded stud supports having an eccentric stud-receiving open shaft. This provides a repeatable and simplified caster adjustment over a range of positive and negative values.

While such improved caster adjustment mechanisms and techniques have been very beneficial in pre-tuning vehicle suspensions with respect to a given racing venue, essentially all such venues exhibit a topography of both racing turns and straightaway runs. While caster can be optimized prior to a race, its resultant adjustment generally will remain a compromise between more negative caster for turns and more positive caster for straightaway runs.

BRIEF SUMMARY OF THE INVENTION

The present invention is addressed to apparatus for dynamically adjusting the caster of a wheel of an all terrain vehicle (ATV) and to the method of operating such a vehicle incorporating these dynamic mechanisms. Suspension assemblies of the ATVs will have one or more control arms extending from ball joints to pivoted connection with the vehicle frame. This connection, while remaining pivotal is provided with follower assemblies. Such follower assemblies operationally perform with translation assemblies fixed to the vehicle frame and are configured having translation axes which are generally parallel with the vehicle axis. When moving along the translation axes in a positive caster sense, the associated control arm supported ball joint is urged toward a positive caster orientation. Conversely, when the follower assemblies move along the translation axes in a negative sense, the associated control arm supported ball joint is urged toward a negative caster orientation.

In one embodiment, the translation assembly comprises one or more stationary threaded shafts and the associated follower assembly is automatically translationally moved along the translation axis in a positive sense when its associated control arm is pivotally moved downwardly by virtue of the dynamic activity of the moving vehicle. Conversely, the associated follower assembly is automatically translationally moved along the translation axis in a negative sense when its associated control arm is pivotally moved upwardly by virtue of the dynamic activity of the vehicle.

In another embodiment, the translation assembly incorporates a motor driven threaded shaft assembly, the latter mechanism being disposed about the translation axis. When the motor is energized in a first polar configuration, the follower connected control arm urges its associated ball joint to move in a positive caster sense. Conversely, when the motor is energized in a second polar configuration, the follower connected control arm urges its associated ball joint to move in a negative caster sense.

As another feature and object, the invention provides a method of operating an all terrain vehicle having a driver supported frame disposed about a vehicle axis, a steering mechanism, right and left front wheels, each rotatable with a hub about a wheel axis, the hub being rotationally mounted with a spindle supported, in turn, by upper and lower ball joints arranged in spaced adjacency and relatively positionable about the wheel axis to define zero caster, positive caster and negative caster, comprising the steps:

providing a right front wheel suspension assembly pivotally mounted to the vehicle frame, extending generally transversely outwardly therefrom to connection with relatively moveable upper and lower ball joints at the right front wheel, actuateable in a positive sense to urge one or more of the ball joints supported thereby toward a positive caster orientation, and actuateable in a negative sense to urge one or more of the ball joints supported thereby toward a negative caster orientation;

providing a left front wheel suspension assembly pivotally mounted to the vehicle frame, extending generally transversely outwardly therefrom to connection with relatively moveable upper and lower ball joints at the left front wheel, actuateable in a positive sense to urge one or more of the ball joints supported thereby toward a positive caster orientation, and actuateable in a negative sense to urge one or more of the ball joints supported thereby toward a negative caster orientation;

actuating at least one of the right and left front wheel suspension assemblies to effect the urging of the one or more ball joints supported thereby toward a negative caster orientation when the vehicle, while being driven, is entering or within a turn; and actuating at least one of the right and left front wheel suspension assemblies to effect the urging of the one or more ball joints supported thereby toward a positive caster when the vehicle while being driven is entering or undergoing straightaway operation.

Other objects of the invention will, in part, be obvious and will, in part, appear hereinafter. The invention, accordingly, comprises the apparatus and method possessing the construction, combination of elements, arrangement of parts and steps which are exemplified in the following detailed disclosure.

For a fuller understanding of the nature and objects of the invention, reference should be had to the following detailed description taken in connection with the accompanying drawings.

BRIEF DESCRIPTION OF THE DRAWINGS

FIG. 6 is a top view of an upper control arm of the all terrain vehicle of FIG. 1 showing the orientation of components in a fully upward pivotal orientation;

DETAILED DESCRIPTION OF THE INVENTION

Figure 1:
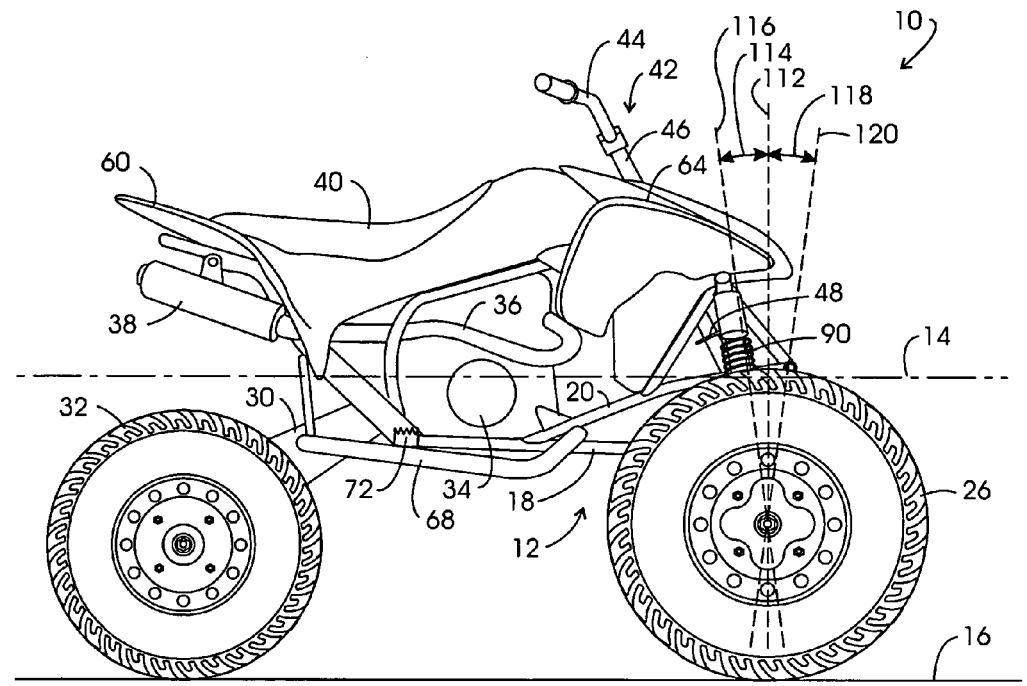
FIG. 1 is a side view of a sport quad all terrain vehicle.

Referring to FIG. 1, a quad sport-type all terrain vehicle (ATV) is represented generally at 10. Vehicle 10 is configured with a tubular frame represented generally at 12. Frame 12 supports a driver and is shown disposed about a vehicle axis 14. In the instant figure, that axis is seen to be parallel with terrain surface 16. The right side of frame 12 is seen to incorporate frame components as at 18 and 20. Looking additionally at FIG. 2, complimentary frame components are seen respectively at 22 and 24. These figures reveal right and left forward wheels respectively at 26 and 28 which are freely rotatable. FIG. 1 reveals a rearwardly directed swing arm 30 which supports a driven axle along with right and left rear drive wheels, the right drive wheel being seen at 32. The diameter of wheels as at 32 is less than that of the front wheels but generally these rear wheels will exhibit a wider geometry.

Frame 12 further supports a motor represented schematically at 34 in FIG. 1. Motor 34 incorporates an exhaust pipe 36 which extends rearwardly to a muffler 38. Above the motor 34, frame 12 supports a rather elongate seat 40 and forwardly thereof a steering mechanism represented generally at 42 being comprised of handlebars 44 and a steering column 46. FIG. 1 illustrates a switching ring 48 which rotates with the steering column 46. That switching ring 48 reappears in FIG. 2 in conjunction with a micro-switch box 50 mounted, in turn, upon a strut 52. Further shown below the strut 52 is a right tie-rod 54 extending toward wheel 26 and a left tie-rod 56 extending toward wheel 28.

Figure 2:
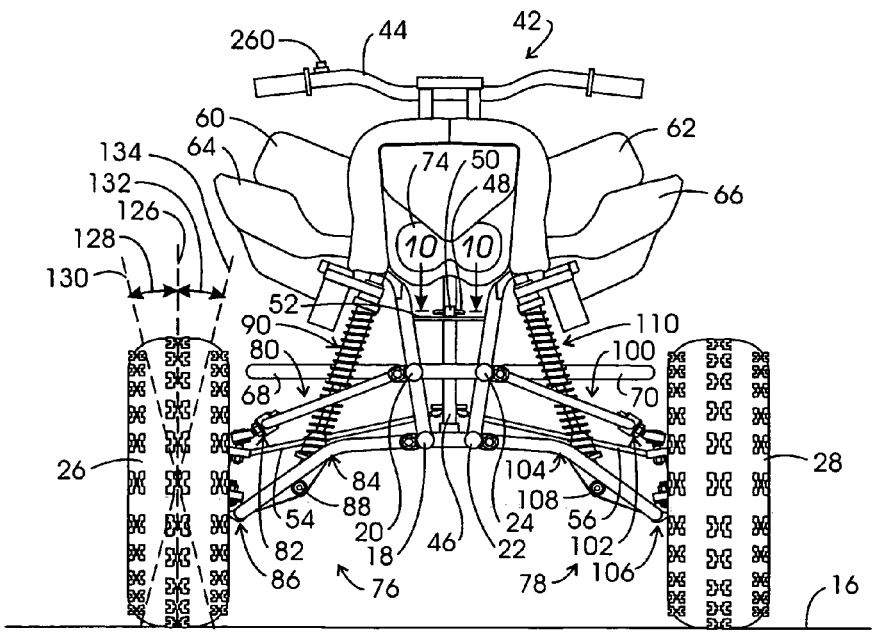
FIG. 2 is a front view of the vehicle shown in FIG. 1.

FIGS. 1 and 2 further reveal rear fairings 60 and 62 in association with the seat 40 which functions somewhat as a rear fender. Correspondingly, front fenders are defined at 64 and 66. Associated with seat 40 are right and left foot safety frames 68 and 70 which typically support a polymeric web as well as foot rests, one of which is shown in FIG. 1 at 72. In general, the technique of driving vehicles as at 10 as in all vehicle racing involves a talent of the driver. For all terrain vehicles employed for racing, driver position is utilized in vehicle control. For instance, in accelerating at the commencement of a straightaway run, the driver will be under dynamic forces tending to move he or she rearwardly on seat 40 as the axis 14 rotates upwardly in the vicinity of front wheels 26 and 28 with respect to terrain 16. When negotiating turns the driver often will be leaning forwardly into the turn; applying brakes where necessary; and the turning action of the wheel itself will tend to slow down vehicle 10 in the sense that the vehicle axis 14 will rotate downwardly toward surface 16 into the vicinity of wheels 26 and 28.

FIG. 2 further reveals frame supported headlights 74 and the general features of the right front and left front wheel suspension assemblies represented in general respectively at 76 and 78. Suspension assembly 76 is seen to incorporate suspension components supporting wheel 26. In this regard, the wheel is supported, inter alia, by an upper control arm represented generally at 80. Configured as a tubular A-arm, device 80 is pivotally mounted to brackets coupled to frame member 20 and extends to a ball joint assembly represented generally at 82. Wheel 26 also is supported by a lower control arm represented generally at 84 which is pivotally supported from brackets attached, in turn, to frame member 18. Device 84 extends to a ball joint assembly represented generally at 86 and is configured with a connector assembly 88 which, in turn, is attached to a coil over shock absorber assembly represented generally at 90, the upper portion of which is attached to frame 12.

In the same fashion, left front wheel 28 is suspended, inter alia, by an upper control arm represented generally at 100 which is pivotally coupled to brackets connected to frame member 24 and extends to an upper ball joint assembly represented generally at 102 which is pivotally attached to brackets extending from frame member 22 and extends to a lower ball joint assembly represented generally at 106. Control arm 104 also is configured with a connector assembly 108 which, in turn, is coupled to the lower end of a coil over shock absorber assembly represented generally at 110.

Caster adjustment essentially is a relationship between the upper and lower ball joint assemblies, i.e., their relative orientation, and is an adjustment for control stability of the vehicle. Returning to FIG. 1, a zero caster is represented by vertical dashed line 112 extending through the turn axis of wheel 26. Positive caster adjustment is represented by arrow defined angle 114 and dashed line 116. On the other hand, negative caster is represented at arrow defined angle 118 and dashed line 120. With positive caster, the vehicle is more stable in a straightaway run operation but it is harder to steer into and through a turn. On the other hand, negative caster adjustment enhances the stability of the vehicle when steering through a turn. Accordingly, it is apparent that as these vehicles are raced in different venues, convenience in adjusting caster, as well as the opportunity to be able to accurately repeat these adjustments will be quite beneficial. Such pre-race adjustment is considerably facilitated by the mechanism described in application for U.S. patent Ser. No. 11/266,697 (supra). With the instant caster adjustment approach, that mechanism is employed but in conjunction with a dynamic adjustment of the caster of a wheel during a race itself. For example, one of the control arms of suspension assemblies 76 and 78 will be translated along a locus generally parallel to vehicle axis 14 to provide, for example, about a 5° alteration of caster either in a positive or negative sense.

In one embodiment of the invention, caster adjustment is dynamically carried out automatically with a translation assembly associated with the upper control arm wherein one or more stationary threaded shafts or screws are utilized in conjunction with a follower assembly. Accordingly, it is the upward pivotal movement and downward pivotal movement of suspension assemblies 76 and 78 which dynamically adjust caster. Motorized translation also may be provided to derive, for example, a variety of translational adjustments through utilization of a driver actuated motor-controlling switch.

Returning to FIG. 2, a zero camber is represented at dashed line 126. A positive camber is represented by arrow-defined angle 128 and dashed line 130. Correspondingly, a negative camber is represented by arrow-defined angle 132 and dashed line 134.

Figure 3:
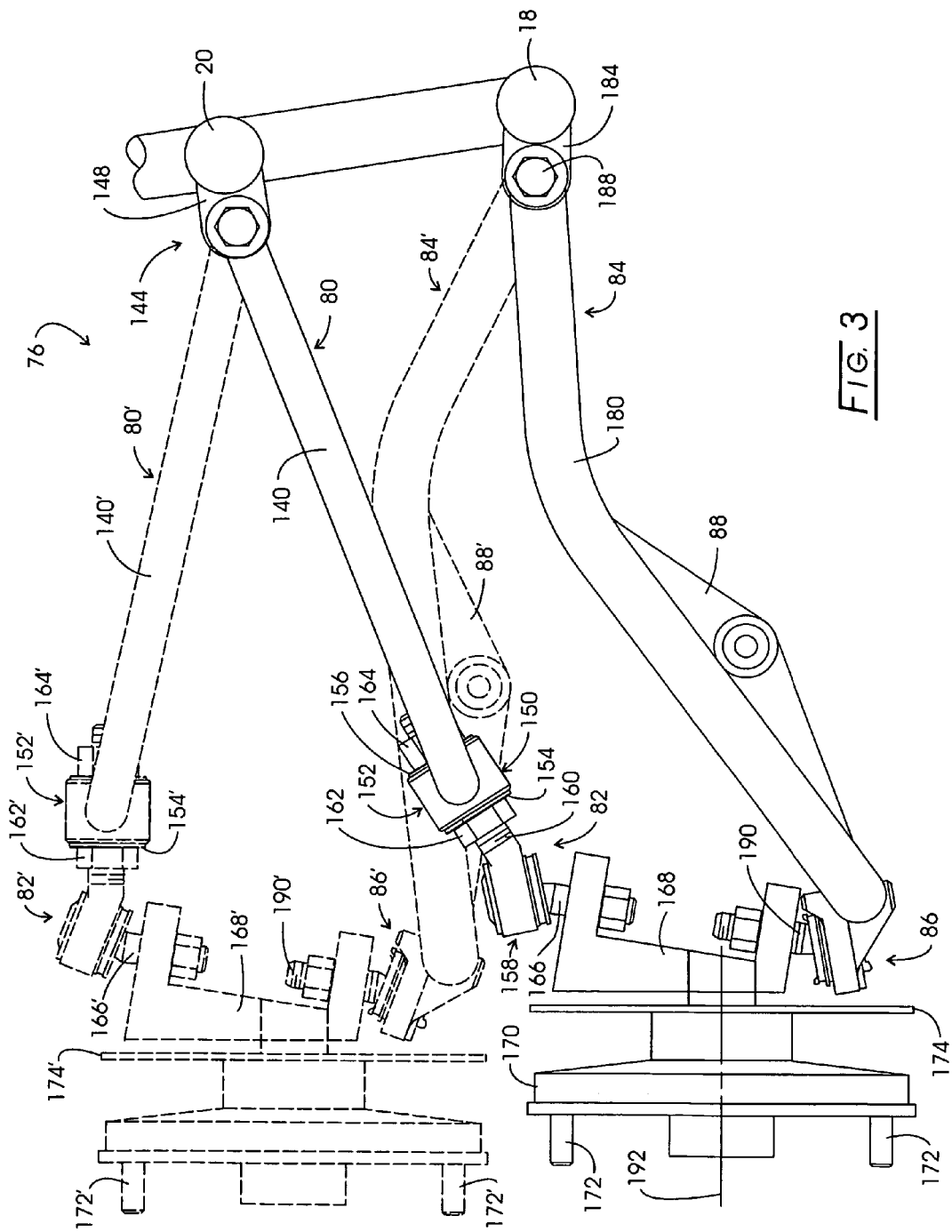
FIG. 3 is a partial side view of the control arm suspension of the vehicle of FIG. 1 showing it in its lowest pivotal orientation and, in phantom, in its uppermost pivotal orientation.

Referring to FIG. 3, right wheel suspension assembly 76 is illustrated in a front view in two pivotal orientations. That pivotal orientation shown in solid line fashion represents the pivoting of arms 80 and 84 to a fully downward limit as may be encountered as the vehicle 10 is accelerated in a straight-away run. Shown in phantom in the drawing is the corresponding full upward pivotal orientation of the control arms which now are identified at 80' and 84'. Looking in particular to the fully downward pivotal orientation the forward leg of upper control arm 80 is shown at 140 extending from a pivotal follower assembly represented generally at 144. Assembly 144, in turn, is coupled to a bracket 148 welded to frame member 20. Forward arm 140 extends to welded connection with one side of the earlier-described eccentric-based caster adjustment apparatus represented generally at 150. Connection is seen to be made with the support assemblage thereof represented generally at 152. Abuttably positioned against the forward edge surface of assemblage 152 is the flange portion 154 of an eccentric-based stud support. A disc-shaped retainer member 156, which also carries an eccentric opening, is engaged adjacent the inward edge of support assemblage 152. Ball joint assembly 82 is seen to be configured with a ball joint portion represented generally at 158 to which is rigidly connected a threaded stud 160. A camber adjusting nut 162 is threadably engaged with stud 160 and is compressively urged against the outer surface of the stud support inwardly from its flange portion 154. An inwardly disposed nut 164 is tightened against the disc-shaped retainer member 156. Returning to ball joint 158, its pivotal connector 166 is seen to be bolted to a spindle 168. Spindle 168, in turn, supports rotatable hub 170 from which an array of studs project, two of which are shown at 172. A rotor 174 also rotates with the hub 170.

Looking to lower control arm 84, a forward leg 180 thereof is seen to be coupled with frame member 18 at a bracket 184 extending therefrom. A pivot as at 188 may incorporate bearings, bushings or the like. Arm 180 extends to one side of the ball joint assembly 86. That assembly includes a pivotal connector 190 which is coupled by a nut with the lower side of spindle 168. Hub 170 rotates about a wheel axis 192. It is this axis which is intersected by vertical dashed line 112 as described in connection with FIG. 1.

As vehicle 10 is driven into a turn, forward downward pressure is generated as above described and the upper pivoted movement of suspension assembly 76 is represented in phantom. The components of the arm in this upward pivotal orientation are identified with the same numeration as utilized above but in primed fashion.

Figure 4:
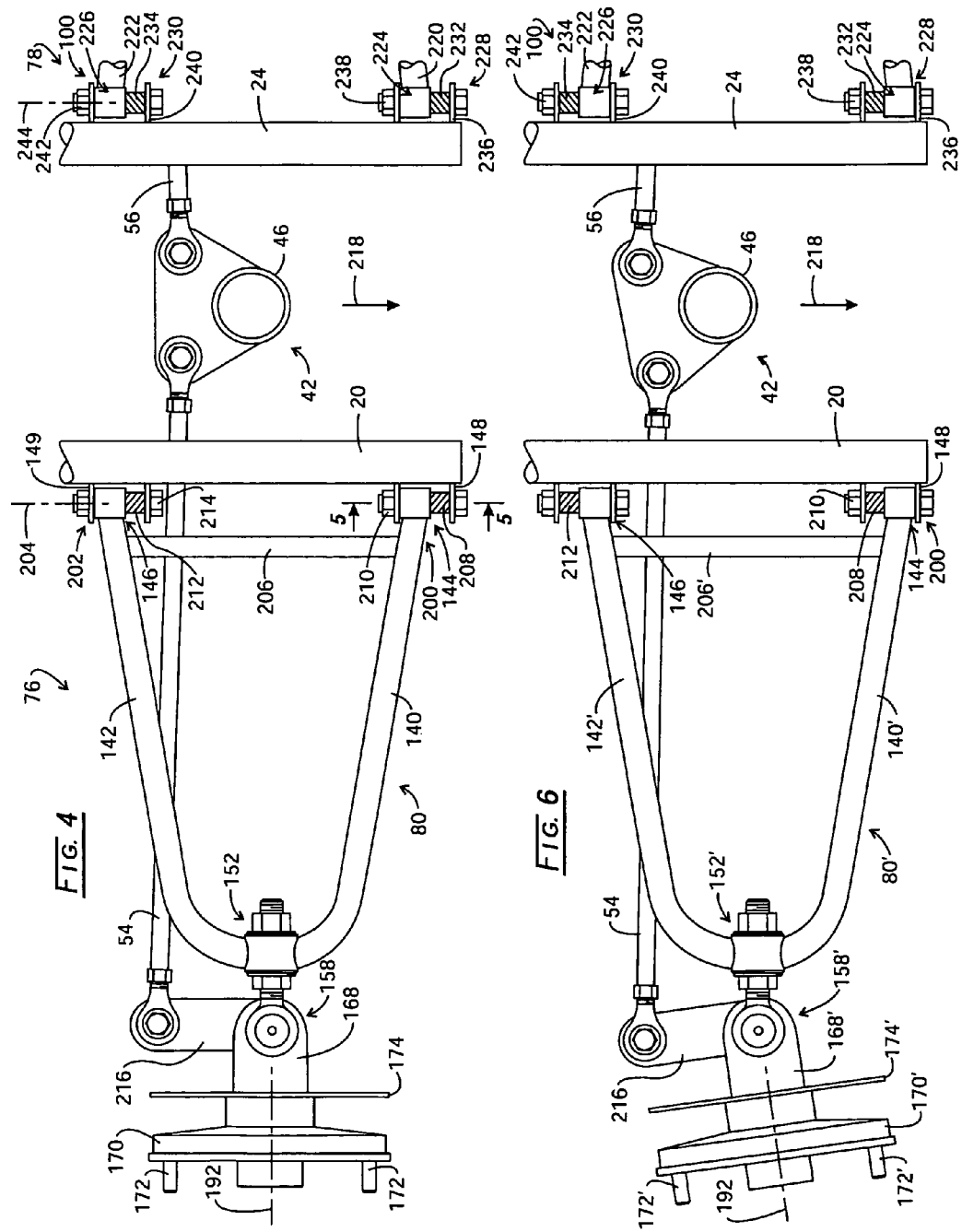
FIG. 4 is a top view of the upper control arm of the all terrain vehicle in FIG. 1 as it appears in a pivotal lowermost orientation.

Referring to FIG. 4, a top view of upper control arm 80 is presented as it is pivoted to its full extent downwardly as described in connection with the solid line illustration of FIG. 3. Arm 80 is seen to be configured with earlier-described forward leg 140 and with rearward leg 142 which extend from respective translation assemblies represented generally at 200 and 202 which are disposed about a translation axis 204. Axis 204 in general is parallel with the vehicle axis 14. In the figure, translation assembly 200 is seen to be configured having a stationary threaded shaft or screw 208 fixed to frame member 20 at bracket 148 with a nut and bold connection 210. Pivoting follower assembly 144 is seen to engage the stationary threaded shaft screw 208. In similar fashion translation assembly 202 is configured with a stationary threaded shaft or screw 212 which is fixed to frame member 20 at bracket 149 by a nut and bolt connection 214. Rearward leg 142 of the control arm 80 extends to a pivoting follower assembly represented generally at 146 which is engaged with stationary threaded shaft or screw 212. For this downward pivoting orientation of right upper arm 80 steering column 46 generally will have oriented tie-rod 54 for steering in a straightaway run mode. Accordingly, tie-rod 54 is seen pivotally connected through arm 216 to spindle 168 in general for a straight ahead run thus wheel axis 192 does not reflect a turning condition. However, arm 80 with its pivoting follower assemblies 144 and 146 will have translated rearwardly along axis 204 to dynamically provide a positive caster. The forward portion and movement of vehicle 10 is represented by arrow 218. Note that this form of dynamic caster adjustment is automatic and does not affect the camber adjustment.

Upper arm 100 of left front wheel suspension assembly 78 is similarly structured. In this regard, forward leg 220 and rearward leg 222 of upper arm 100 respectively extend to pivoting follower assemblies shown generally at 224 and 226. Those follower assemblies are engaged with respective translation assemblies represented generally at 228 and 230. Assembly 228 is configured with a stationary threaded shaft or screw 232. Stationary shaft 232 is mounted to frame member 24 at a bracket 236 with a bolt and nut connection 238. In similar fashion, stationary threaded shaft or screw 234 is fixed to frame member 24 at a bracket 240 in conjunction with nut and bolt connection 242. Stationary shafts 232 and 234 are symmetrically disposed about a translation axis 244 corresponding with axis 204. However, it may be noted that to provide corresponding translational movement rearwardly in the same manner as the right side of vehicle 10, the threads of stationary threaded shafts 232 and 234 are configured in a reverse sense, i.e., right hand versus left hand with respect to stationary threaded shafts 208 and 212.

Figure 5:
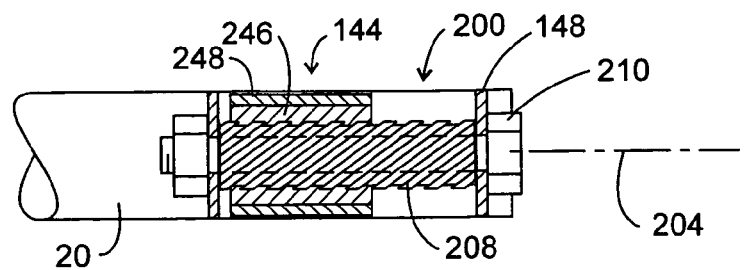
FIG. 5 is a partial section view taken through the plane 5-5 shown in FIG. 4.

Looking to FIG. 5, a sectional view of translation assembly 200 and its associated pivoting follower assembly 144 is presented. In the figure, stationary threaded shaft 208 is shown retained by bolt and nut assembly 210 to bracket 148. Bracket 148 is seen extending from frame member 20. Follower assembly 144 is configured with a generally cylindrical internally threaded follower nut 246 engaging the external threads of stationary threaded shaft 208. Nut 246 is press fit within a cylindrical outer steel retainer 248 weldably coupled to forward leg 140.

Referring to FIG. 6, the automatic development of negative-going caster as the upper control arms 80 and 100 are pivoted upwardly is illustrated. This upward orientation has been described in conjunction with a phantom representation in FIG. 3. The automatic development occurs when forces cause the vehicle axis to pivot downwardly in the vicinity of front wheels 26 and 28. In the figure, steering column 46 has been maneuvered by the driver to cause tie-rod 54 to move from its straight ahead orientation to an orientation turning spindle 168' through arm 216. Note that pivoting follower 144 has moved forwardly along axis 204 upon stationary threaded shaft 208. Similarly, pivoting follower 146 has also moved forwardly upon stationary threaded shaft 212 of translation assembly 202. Similarly, follower 224 has moved forwardly on stationary screw or threaded shaft 232 of translation assembly 228. Corresponding translation occurs in conjunction with pivoting follower 226 as it is translationally moved along stationary threaded shaft 234 of translation assembly 230.

The dynamic adjustment of caster also can be accomplished with a rotating screw or threaded shaft and pivoting follower arrangement. Driven rotation of the threaded shaft may be accomplished with a motor and gear assembly which is energized, for example, by driver turning of the handlebars 44 or, as seen in FIG. 2 by actuating a bi-directional drive hand switch as seen at 260. With the latter approach, the amount of caster adjustment either in a positive or negative sense can be varied, for example, to intermediate positions between follower stops or limits.

Figure 7:
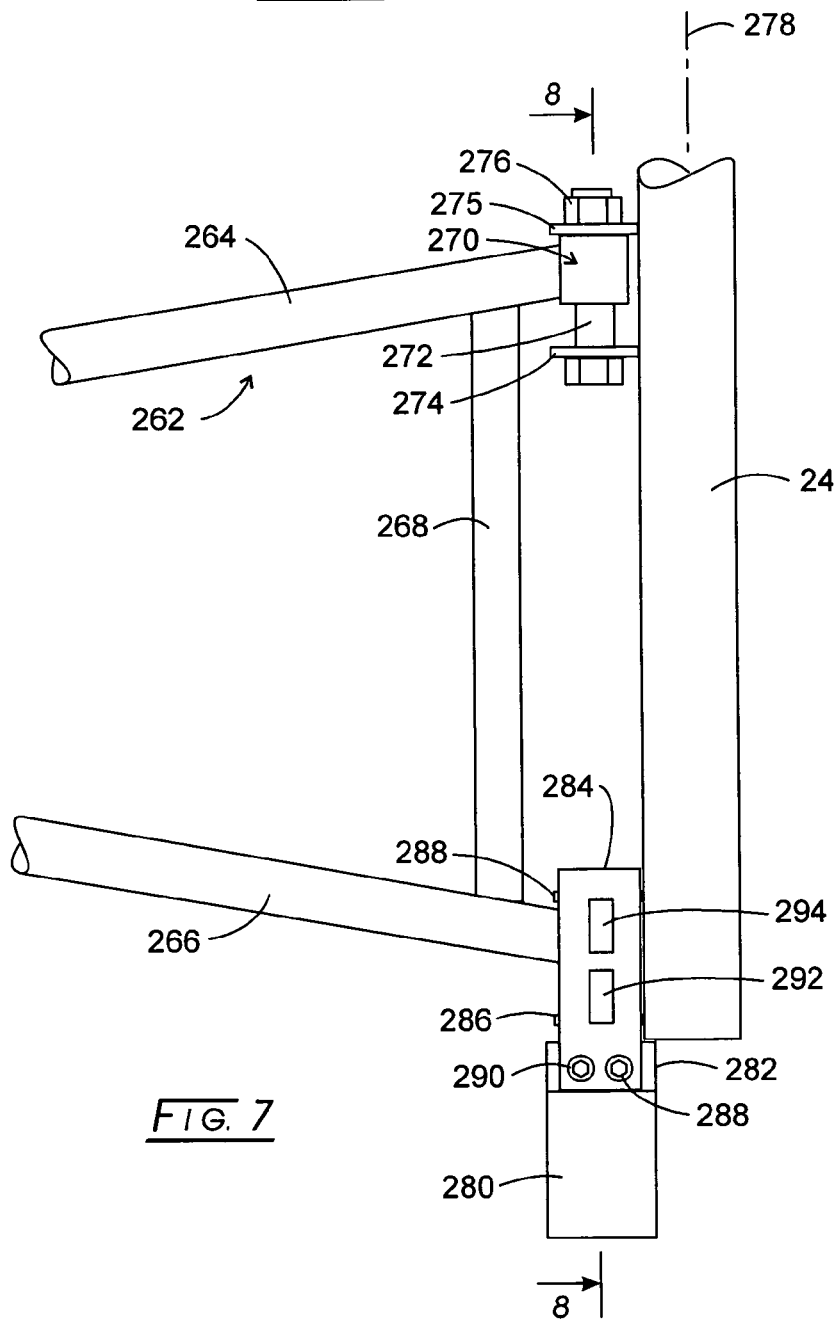
FIG. 7 is a partial top view of the control arm of an all terrain vehicle showing a motor actuated translation mechanism.

Referring to FIG. 7, an upper A-arm is represented generally at 262. Arm 262 is configured with front and back legs shown respectively at 264 and 266 which are structurally reinforced by a cross bar 268. Arm 266 extends to an inner end to which is coupled a pivot sleeve represented generally at 270. Sleeve 270 is pivotally and slidably retained upon a pivot shaft 272. Shaft 272, in turn, is connected to a bracket 274 by nut and bolt connector 276. Bracket 274 is weldably secured to frame member 24. Rearward leg 266 extends inwardly to engagement with a pivoting follower assembly (not shown) which is moved translationally, for instance, along translation axis 278 by a rotationally driven threaded shaft (not shown). Rotational drive is imparted from an electric motor 280 having an output coupled with a gear train assembly 282. Assembly 282 may be provided, for instance, as a planetary gear assemblage. Gear box 282 is of rectangular profile. On to it is bolted a generally L-shaped housing cap 284. In general, the assemblage is attached to frame member 24 by two brackets, portions of which are seen at 286 and 288. Attachment of the housing cap 284 is by machine screws as at 288 and 290. Downwardly depending limit switches are shown at 292 and 294.

Figure 8:
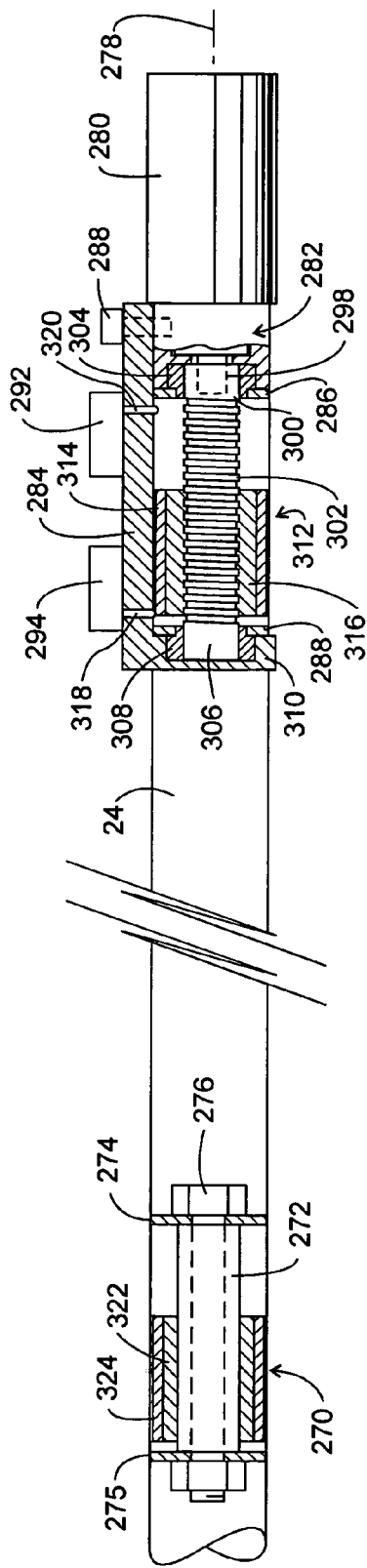
FIG. 8 is a sectional view taken through the plane 8-8 shown in FIG. 7.

Referring to FIG. 8, a sectional view of this assemblage is provided. Motor 280 reappears as connected with reduction gear box 282. Box 282, in turn, is supported by bracket 286 which is rectangular in profile to avoid twisting of the assembly. The drive output from the gear reduction assemblage is provided at a non-circular shaft shown in phantom at 298 which extends into the unthreaded end 300 of a threaded shaft 302. End 300 rotates within a bushing 304 extending into the gear box 282 as well as through the center of bracket 286. Threaded shaft 302 extends along axis 278 to an oppositely disposed unthreaded end 306 rotationally supported within a bushing 308 mounted within the L-shaped portion 310 of housing tap 284. The shaft further extends through bracket 288 which also is configured with a rectangular periphery and is welded to vehicle frame member 24. Driven from the threaded shaft 302 is a pivoting follower assembly represented generally at 312 which is formed of a cylindrical steel sleeve weldably attached to leg 266 within which is a cylindrical, internally threaded follower nut 316. Follower 316 may be formed of brass or the like and press-fitted and keyed within the sleeve 314. Limit switch 294 reappears in conjunction with its actuated shaft 318. Actuation occurs by virtue of the contact of slidably mounted shaft 318 with the outer surface of sleeve 314. The switch is in a "made" orientation. Switch 292 also appears with its actuating shaft 320 extending in a "not made" orientation.

Pivot sleeve 270 reappears in the figure with its pivot shaft 272 being attached to bracket 274 with a bolt and nut assemblage 276. The pivot sleeve 270 is configured with an outer steel sleeve 322 which is welded to leg 264 and an inner bushing 324. Bushing 324 may be press-fit within sleeve 322 and may be formed of brass or the like for slideability over the pivot shaft 272. With the arrangement shown, with the energization of motor 280 in a given polar sense for predetermined rotational direction threaded shaft or screw 302 will be rotated to, in turn, translate or move follower assembly 312. Such movement is limited by the functioning of limit switches 292 and 294. As movement of the follower assemblage 312 takes place, a corresponding translational movement is imparted to the sleeve 270 as it rides upon shaft 272.

Figure 9:
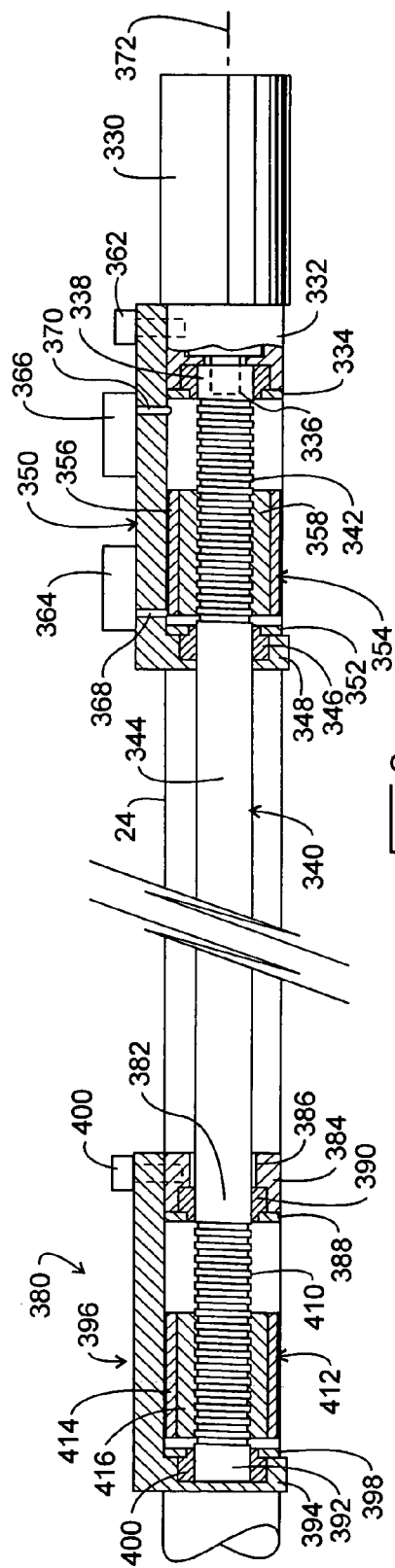
FIG. 9 is a sectional view similar to FIG. 8 but showing two simultaneously driven pivotal follower mechanisms.
Figure 10:
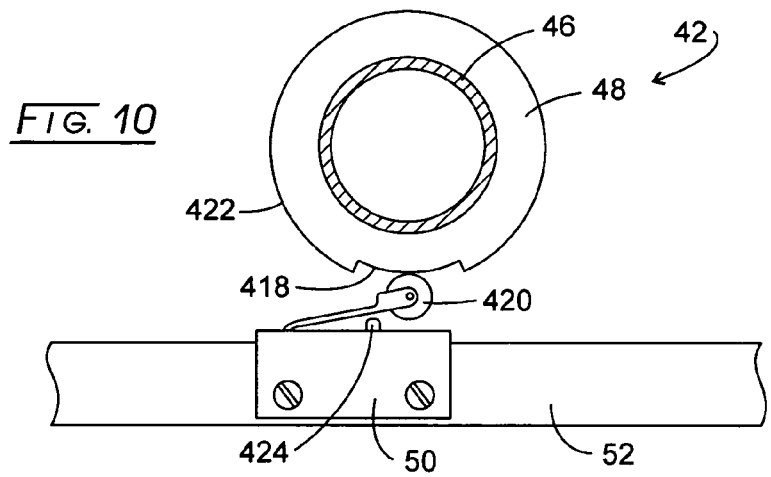
FIG. 10 is a partial front view of the all terrain vehicle of FIG. 1 showing a steering mechanism actuated switch mechanism.

Both legs of the A-arm may be motor driven with a dual threaded shaft or screw which extends between two spaced apart pivoted follower assemblies. Referring to FIG. 9, a bi-directional motor is shown at 330 having a drive output coupled with a reduction gear assembly retained within a gear box 332. Box 332 is attached to vehicle frame member 24 by a bracket of rectangular periphery 334. The output shaft from the gear reduction assembly is represented in phantom at 336. As before, shaft 336 is non-circular and driveably engages an unthreaded end 338 of a somewhat elongate dual threaded shaft represented generally at 340. Adjacent the unthreaded end 338 is a threaded portion 342 which extends to an elongate unthreaded portion 344 of shaft 340. One end of this unthreaded portion 344 is rotatably supported by a bushing 346 which is mounted within the L-shaped portion 348 of a housing cap represented generally at 350. Bushing 346 additionally extends through a bracket 352 of non-circular periphery which, in turn, is weldably attached to vehicle frame 24. Riding upon the threaded portion 342 is a pivotal follower assembly represented generally at 354. Assembly 354 is formed with an outer steel sleeve 356 which is weldably attached to an A-frame leg and within which there is pressfitted internally threaded follower nut 358. Cap 350 is attached to gear box 332 with two machine screws, one of which is shown at 362. Also extending through the cap are the actuating shaft of limit switches 364 and 366. Actuating shaft 368 is seen abutting the outer surface of sleeve 356 and thus is in a "made" orientation, while the corresponding actuating shaft 370 of switch 366 is not in an abutting contact and is thus "not made". Shaft 340 is rotatably driven about translation axis 372 and extends to another translation drive assembly represented generally at 380. In this regard, the unthreaded portion 382 of shaft 340 extends into assembly 380 at a support component 384 having a cylindrical opening extending therethrough, a portion of which is seen at 386. Device 384 is attached to a bracket 388 which is weldably coupled to vehicle frame 24. Extending within the support component 384 and through bracket 388 is a bushing 390 within which unthreaded shaft portion 382 rotates. Shaft 340 extends to an outboard unthreaded portion 392 which extends into the L-shaped portion 394 of a housing cap represented generally at 396. A bracket is seen at 398 which is welded to frame member 24. Unthreaded portion 392 of shaft 340 is supported in L-shape portion 394 and extends through bracket 398 to be supported within a bushing 400. Busing 400 is mounted within L-shaped portion 394 and extends through bracket 398. Between bushings 390 and 400 is a second threaded portion 410 of shaft 340. Coupled in driven relationship with this threaded portion 410 is a pivotable follower assembly represented generally at 412. As before, the follower assembly is configured with an outer steel sheath of cylindrical configuration which is weldably coupled with one leg of an A-arm. Press-fitted within the sleeve 414 is an internally threaded follower component 416 which is driveably translated with the rotation either clockwise or counterclockwise of the shaft 340. For the motor driven embodiments of FIGS. 7-10, the pitch of the threaded shafts may be made more shallow or with less angularity. Thus, the pivoting of the control arms will develop less of a translational effect.

Motors as at 280 and 330 may be energized selectively by the driver utilizing switches as described in FIG. 2 at 260 or they operate between limit switch demarked translation locii. For the latter control approach, motor energization can be provided in conjunction with the turning of handlebars 44. Looking to FIG. 10, switching ring 48 and associated microswitch 50, as described earlier in connection with FIG. 2, are reproduced in an enlarged scale. In the figure, ring 48 is seen to be configured with a switch off arcuate cam region 418 which engages a spring biased switching follower 420 when vehicle 10 is in a straightaway run or the handlebars are aligned for straightaway travel. However, when the steering mechanism 42 is turned follower 420 engages the outer cam surface 422 of ring 48 to actuate the switch 50 into a made or on-condition by the depression of switch actuator rod 424. Depending upon the orientation of follower 420, motors as at 208 or 330 will be energized to drive the follower components between one or the other of the limit switch locations.

Figure 11:
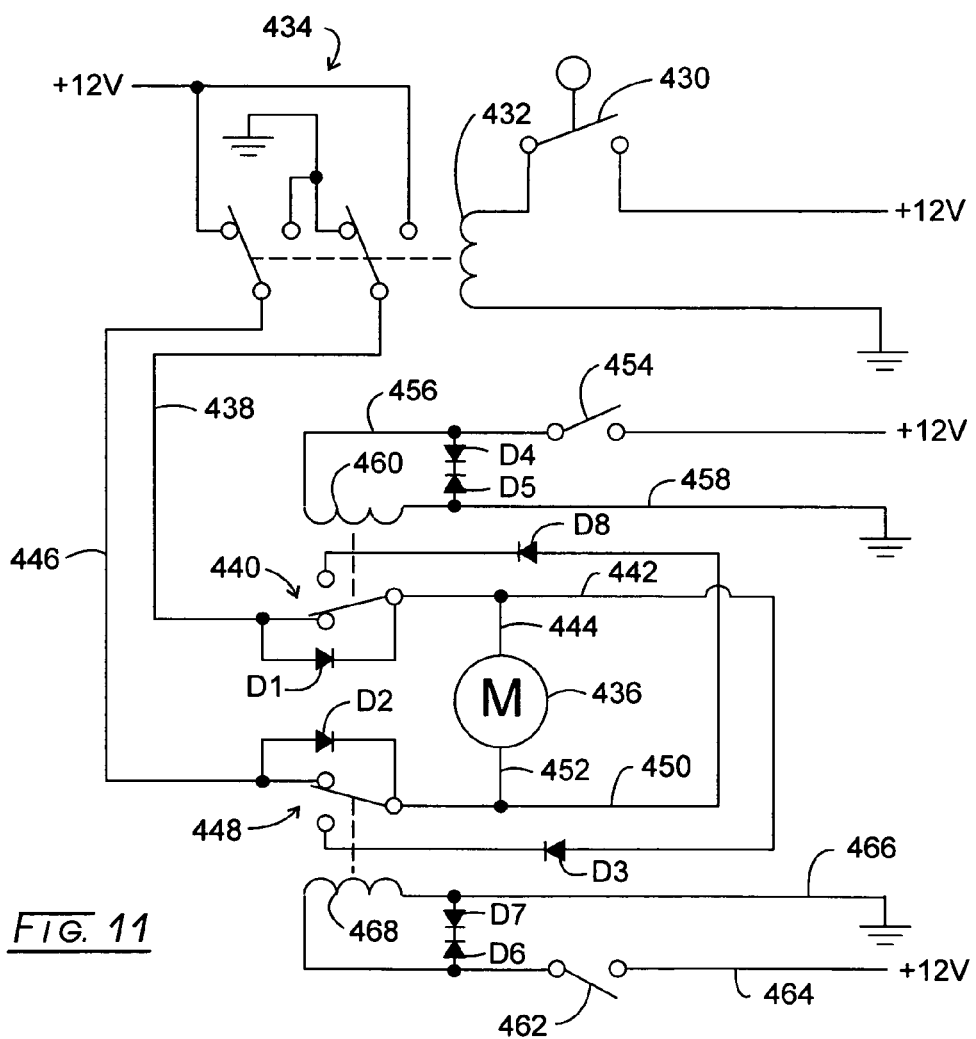
FIG. 11 is a schematic electrical diagram showing a switching mechanism for operating the motors illustrated in FIGS. 7-9.

A variety of switching circuit topologies may be employed with the system and method at hand. Referring to FIG. 11, one switching approach is illustrated. The principal switch in the circuit is present at 430. Switch 430, for instance, may be steering mechanism actuated or driver actuated as described at 260 in connection with FIG. 2. The switch is a relay actuator being coupled between +12V and ground and functioning to energize a relay winding 432. Winding 432 functions to actuate a double-pole double-throw switch represented in general at 434 which is biased for closure in one direction and moved into opposite closure with the energization of winding 432. Coupled between +12V and ground, the double-throw switch 434 determines the polar sense in which a motor represented at motor symbol 436 is driven. Motor 436 is driven from polarized leads 438 and 446. With the switch orientations depicted limit switches 454 and 462 are open and motor 436 is running. The current drive path includes lead 438, relay switch 440, lines 442 and 444, motor 436, lines 452 and 450, relay switch 448 and line 446. With the closing of limit switch 462, winding 468 is energized from lines 464 and 466. Switch 448 is opened against bias to line 442 incorporating braking diode D3. When limit switch 462 again opens as switch 434 is thrown to reverse polarity, the circuit drive path remains the same but current direction changes. Dynamic motor braking is carried out with diodes D1, D2, D3 and D8. The opposite limit switch is shown at 454. Its closure will energize winding 460 from lines 456 and 458 to close switch 440 to line 450. Diodes D4, D5, D6, and D7 are spike suppressors.

Since certain changes may be made in the above-described method and apparatus without departing from the scope of the invention herein involved, it is intended that all matter contained in the description thereof or shown in the accompanying drawings shall be interpreted as illustrative and not in a limiting sense.

The invention claimed is:

1. The method of operating an all terrain vehicle having a driver supporting frame disposed about a vehicle axis, a steering mechanism, oppositely disposed right and left front wheels each rotatable with a hub about a wheel axis, the hub being rotatably mounted with a spindle supported, in turn, by upper and lower ball joints arranged in spaced adjacency and relatively positionable about the wheel axis to define zero caster, positive caster and negative caster, comprising the steps:

providing a right front wheel suspension assembly pivotally mounted to said frame, extending generally transversely outwardly therefrom to connection with relatively moveable upper and lower ball joints at said right front wheel, actuateable in a positive sense to urge one or more of the ball joints supported thereby toward a positive caster orientation, and actuateable in a negative sense to urge the ball joints supported thereby toward a negative caster orientation;

providing a left front wheel suspension assembly pivotally mounted to said frame, extending generally transversely outwardly therefrom to connection with relatively moveable upper and lower ball joints at said left front wheel, actuateable in a positive sense to urge the ball joints supported thereby toward a positive caster orientation, and actuateable in a negative sense to urge one or more of the ball joints supported thereby toward a negative caster orientation;

actuating at least one said right and left front wheel suspension assemblies to effect the urging of the one or more ball joints supported thereby toward a negative caster orientation when said vehicle, while being driven, is entering or within a turn; and actuating at least one said right and left front wheel suspension assemblies to effect the urging of the one or more ball joints supported thereby toward a positive caster when said vehicle while being driven is entering or undergoing straightaway operation.

2. The method of claim 1 in which:

each said right and left front wheel suspension assemblies is provided comprising one or more suspension components pivotally movable upwardly or downwardly; and said step actuating at least one of said right and left front wheel suspension assemblies is carried out by translating the one or more suspension components along a locus generally parallel with said vehicle axis.

3. The method of claim 2 in which:

each of said right and left front wheel suspension assemblies is provided comprising one or more stationary threaded shafts fixed to said frame in generally parallel relationship with said vehicle axis, said one or more suspension components are pivotally mounted to said one or more threaded shafts with a follower assembly;

said step actuating at least one of said right and left front wheel suspension assemblies is automatically effected by the pivoting of said one or more suspension components.

4. The method of claim 3 in which:

said step actuating at least one of said right and left front wheel suspension assemblies translates the one or more suspension components to move to or toward a positive caster orientation when said pivoting is a downward movement.

5. The method of claim 3 in which:

said step actuating at least one of said right and left front wheel suspension assemblies translates the one or more suspension components to move to or toward a negative caster orientation when said pivoting is in an upward direction.

6. The method of claim 2 in which:

each of said right and left front wheel suspension assemblies is provided comprising a motor driven translation assembly selectively energizable to effect said translation forwardly or rearwardly generally in parallel with said vehicle axis; and said actuation is carried out by energizing said motor driven translation assembly.

7. The method of claim 6 in which:

said motor driven translation assembly is provided comprising an electric motor driven threaded shaft mounted generally in parallel relationship with the vehicle axis and one or more of said suspension components is coupled in follower relationship with the driven threaded shaft.

8. The method of claim 6 in which:

said actuation is carried out by switching current to said electric motor in a selected polar sense.

9. The method of claim 8 in which:

the switching actuation is carried out by the driver of the vehicle.

10. The method of claim 8 in which:

the switching actuation is effected by the orientation of the vehicle steering mechanism.

11. Apparatus for dynamically adjusting the caster of a wheel of an all terrain vehicle having a driver supporting frame disposed about a vehicle axis, a steering mechanism, the wheel being supported by a hub and rotatable therewith about a wheel axis, the hub being rotatably mounted with a spindle supported, in turn by upper and lower ball joints arranged in spaced adjacency and relatively positionable about the wheel axis to define zero caster, positive caster and negative caster, comprising:

a suspension assembly having one or more control arms with an end supporting a ball joint and extending inwardly therefrom to an inward end adjacent the vehicle frame;

a follower assembly fixed to said inward end; and a translation assembly fixed to said vehicle frame, having a translation axis generally parallel with said vehicle axis and coupled in pivoting and translational following relationship with said follower assembly to urge the ball joint supported by the control arm in a positive sense toward a positive caster orientation or to urge the ball joint in a negative sense toward a negative caster orientation.

12. The apparatus of claim 11 in which:

said translation assembly comprises one or more stationary threaded shafts fixed to said frame; and said follower assembly is automatically translationally moved along said translation axis in said positive sense when said control arm is pivotally moved downwardly.

13. The apparatus of claim 12 in which:

said follower assembly is automatically translationally moved along said translation axis in said negative sense when said control arm is pivotally moved upwardly.

14. The apparatus of claim 13 in which:

the control arm is configured with two, spaced apart inward ends, one supporting said follower assembly and the other supporting a translationally slideable pivot component; and the translation assembly comprises said stationary threaded shaft engaged with said follower assembly supported at said one inward end, and a slide support disposed about the translation axis, spaced from said stationary threaded shaft and slideably engageable with said translationally slideable pivot component.

15. The apparatus of claim 13 in which:

the control arm is configured with two, spaced apart inward ends, each supporting a follower assembly; and the translation assembly comprises said stationary threaded shaft extending along said translation axis and having one or more threaded portions located to engage each inward end supported follower assembly.

16. The apparatus of claim 11 in which:

said translation assembly comprises a motor driven threaded shaft assembly disposed about said translation axis, energizable in a first polar configuration to effect the urging of the ball joint supported by the control arm in said positive sense, and in a second polar configuration to effect the urging of the ball joint supported by the control arm in said negative sense, and a switch assembly actuateable to energize said motor driven screw assembly in said first and second polar configurations.

17. The apparatus of claim 16 in which:

said control arm is configured with two spaced apart inward ends, one supporting a follower assembly and the other supporting a translationally slideable pivot component; and the translation assembly comprises said motor driven threaded shaft engaged with said follower assembly supported at said one inward end; and a slide support disposed about the translation axis, spaced from said motor driven threaded shaft and slideably engageable with said translationally slideable pivot component.

18. The apparatus of claim 16 in which:

the control arm is configured with two spaced apart inward ends, each supporting a follower assembly; and the translation assembly comprises a motor driven threaded shaft extending along said translation axis with one or more threaded portions located to engage each inward end supported follower assembly.

\* \* \* \* \*